United States Patent
Wu

(10) Patent No.: US 10,979,970 B2
(45) Date of Patent: Apr. 13, 2021

(54) NETWORK CHANNEL ALLOCATION METHOD AND APPARATUS

(71) Applicant: Huawei Technologies Co., Ltd., Shenzhen (CN)

(72) Inventor: Zhen Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 16/313,813

(22) PCT Filed: Jun. 30, 2016

(86) PCT No.: PCT/CN2016/088003
§ 371 (c)(1),
(2) Date: Dec. 27, 2018

(87) PCT Pub. No.: WO2018/000375
PCT Pub. Date: Jan. 4, 2018

(65) Prior Publication Data
US 2019/0239153 A1  Aug. 1, 2019

(51) Int. Cl.
*H04W 48/18* (2009.01)
*H04W 88/06* (2009.01)
*H04W 76/15* (2018.01)
*H04W 72/04* (2009.01)
*H04W 28/24* (2009.01)
*H04W 28/26* (2009.01)

(52) U.S. Cl.
CPC .......... *H04W 48/18* (2013.01); *H04W 28/24* (2013.01); *H04W 28/26* (2013.01); *H04W 72/04* (2013.01); *H04W 76/15* (2018.02); *H04W 88/06* (2013.01)

(58) Field of Classification Search
None
See application file for complete search history.

(56) References Cited

U.S. PATENT DOCUMENTS 8,767,534 B2 * 7/2014 Bruninghaus ........... H04L 67/04
                                                        370/230
9,439,202 B1 * 9/2016 Hou ....................... H04W 72/10
(Continued)

FOREIGN PATENT DOCUMENTS

CN      1735241 A     2/2006
CN    103533669 A     1/2014
(Continued)

*Primary Examiner* — Shripal K Khajuria
(74) *Attorney, Agent, or Firm* — Slater Matsil, LLP

(57) ABSTRACT

Embodiments of the present invention provide a network channel allocation method and apparatus. In one embodiment, a network channel allocation method includes determining, by a terminal, a candidate network channel based on a network request of a first application. The candidate network channel is a network channel on which a communications link port is allowed to be established. The method further includes allocating, by the terminal, a target network channel from the candidate network channel to the first application according to an attribute of the first application. The attribute comprises whether an application has a specified network channel, whether an application is a foreground application, an application priority level, or whether an application has a restricted network channel.

18 Claims, 5 Drawing Sheets

(56) References Cited

U.S. PATENT DOCUMENTS

| | | | |
|---|---|---|---|
| 2003/0084144 A1* | 5/2003 | Lipinski | H04L 41/0896 709/224 |
| 2005/0246381 A1* | 11/2005 | Decenzo | H04N 21/6582 |
| 2011/0075635 A1* | 3/2011 | Ryu | H04W 36/14 370/332 |
| 2013/0128826 A1* | 5/2013 | Lin | H04L 5/0053 370/329 |
| 2013/0295950 A1* | 11/2013 | Ruuska | H04W 72/1215 455/452.1 |
| 2015/0171909 A1 | 6/2015 | Gao | |
| 2016/0192289 A1 | 6/2016 | Visuri et al. | |
| 2016/0330739 A1* | 11/2016 | Webb | H04W 72/0453 |

FOREIGN PATENT DOCUMENTS

| | | |
|---|---|---|
| CN | 10399863 A | 7/2014 |
| CN | 1104717720 A | 6/2015 |
| CN | 105120509 A | 12/2015 |
| CN | 105430701 A | 3/2016 |
| EP | 2884782 A2 | 6/2015 |
| GB | 2381996 A | 5/2003 |

\* cited by examiner

NETWORK CHANNEL ALLOCATION METHOD AND APPARATUS

CROSS-REFERENCE TO RELATED APPLICATIONS

This application is a National Stage of International Application No. PCT/CN2016/088003 filed on Jun. 30, 2016, which is hereby incorporated by reference in its entirety.

TECHNICAL FIELD

The present invention relates to the field of communications technologies, and in particular, to a network channel allocation method and apparatus.

BACKGROUND

As communications technologies develop rapidly, multiple terminals appear, such as mobile phones, tablet computers, and netbooks. These terminals can support one or more wireless networks simultaneously. Each wireless network is corresponding to a network channel. For example, a mobile phone supporting dual SIM dual standby can perform communication by using channels of different networks, such as Global System for Mobile Communications GSM, Wideband Code Division Multiple Access WCDMA, Code Division Multiple Access CDMA, Long Term Evolution LTE, and WiFi networks.

A mobile phone is used as an example. Currently, when the mobile phone performs communication by using different network channels, the mobile phone transmits data services of multiple applications by using a default network channel. The default network channel may be specified by a user or may be set by a system. For example, if the user specifies a network channel corresponding to the GSM as the default network channel of the mobile phone, all data services of multiple applications on the mobile phone are transmitted on the network channel corresponding to the GSM. Further, when there is connectable WiFi for the mobile phone, a system automatically transmits a default data service on a network channel of the WiFi.

When a terminal performs data service transmission, only one of a default network channel or a connectable WiFi network channel is used for transmission, and consequently, the other network channel is idle, and a resource is wasted. In addition, if there are a relatively large quantity of data services transmitted on a currently-used network channel, resources on the currently-used network channel may be insufficient, and applications probably contend for a resource, resulting in an intermittent service stop.

SUMMARY

Embodiments of the present invention provide a network channel allocation method and apparatus, to resolve a prior-art problem that a resource is wasted and applications probably contend for a resource. The present invention can fully utilize all network channels to satisfy a data service requirement of an application.

To achieve the foregoing objective, the following technical solutions are used in the embodiments of the present invention.

According to a first aspect, a network channel allocation method is provided. The method includes: determining, by a terminal, a candidate network channel based on a network request of a first application, where the candidate network channel is a network channel on which a communications link port is allowed to be established; and allocating, by the terminal, a target network channel from the candidate network channel to the first application according to at least one attribute of the first application, where the at least one attribute includes: whether an application has a specified network channel, whether an application is a foreground application, an application priority level, and whether an application has a restricted network channel.

According to a second aspect, a network channel allocation apparatus is provided. The apparatus includes: a determining unit, configured to determine a candidate network channel based on a network request of a first application, where the candidate network channel includes a network channel on which a communications link port is allowed to be established; and an allocation unit, configured to allocate a target network channel from the candidate network channel to the first application according to at least one attribute of the first application, where the at least one attribute includes: whether an application has a specified network channel, whether an application is a foreground application, an application priority level, and whether an application has a restricted network channel.

In the technical solutions provided in the present invention, the candidate network channel on which the communications link port is allowed to be established is determined based on the network request of the first application, and the target network channel is allocated to the first application from the candidate network channel according to the at least one attribute of the first application and a specific preset policy, so that data services of multiple applications can be simultaneously transmitted on multiple network channels. In this way, the multiple network channels supported by the terminal are fully utilized, a transmission rate of the data services is also ensured, and an intermittent service stop caused by resource contention between the applications is avoided.

Optionally, based on the first aspect, the allocating a target network channel from the candidate network channel to the first application according to at least one attribute of the first application includes: determining whether the first application has a specified network channel; and if the first application has no specified network channel, allocating the target network channel from an available network channel of the candidate network channel to the first application, where the available network channel is a network channel on which a communications link port is allowed to be established and that is still included in the candidate network channel after a target network channel is allocated to a second application.

Optionally, based on the second aspect, the allocation unit includes a judging module and an allocation module. The judging module is configured to determine whether the first application has a specified network channel. The allocation module is configured to: if the first application has no specified network channel, allocate the target network channel from an available network channel of the candidate network channel to the first application, where the available network channel is a network channel on which a communications link port is allowed to be established and that is still included in the candidate network channel after a target network channel is allocated to a second application.

Optionally, based on the first aspect, the allocating the target network channel from an available network channel of the candidate network channel to the first application includes: determining whether the first application is a foreground application; and if the first application is a foreground application, allocating, according to channel quality of the available network channel in the corresponding preset period, a network channel with highest channel quality from the available network channel as the target network channel of the first application.

Optionally, based on the second aspect, the judging module is further configured to determine whether the first application is a foreground application; and the allocation module is further configured to: if the first application is a foreground application, allocate, according to channel quality of the available network channel in the corresponding preset period, a network channel with highest channel quality from the available network channel as the target network channel of the first application.

Optionally, based on the first aspect, after the determining whether the first application is a foreground application, the method further includes: if the first application is not a foreground application, determining an application priority level M of the first application in a preset period; and if M is higher than or equal to a preset level H, allocating, according to channel quality of the available network channel in the corresponding preset period, a network channel with highest channel quality from the available network channel as the target network channel of the first application; or if M is lower than a preset level, allocating, according to channel quality of the available network channel in the corresponding preset period, a network channel with lowest channel quality from the available network channel as the target network channel of the first application.

Optionally, based on the second aspect, the allocation unit further includes a determining module. The determining module is configured to: if the first application is not a foreground application, determine an application priority level M of the first application in a preset period; and the allocation module is further configured to: if M is higher than or equal to a preset level H, allocate, according to channel quality of the available network channel in the corresponding preset period, a network channel with highest channel quality from the available network channel as the target network channel of the first application; or the allocation module is further configured to: if M is lower than a preset level, allocate, according to channel quality of the available network channel in the corresponding preset period, a network channel with lowest channel quality from the available network channel as the target network channel of the first application.

Optionally, based on the first aspect, if the target network channel includes at least two network channels, the method further includes: when the first application is a foreground application or the level M of the first application is higher than or equal to H, allocating, to the first application, a network channel that is of the at least two network channels and in which a relatively small quantity of communications link ports have been established; or when the level M of the first application is lower than H, allocating, to the first application, a network channel that is of the at least two network channels and in which a relatively large quantity of communications link ports have been established.

Optionally, based on the second aspect, if the target network channel includes at least two network channels, the allocation module is further configured to: when the first application is a foreground application or the level M of the first application is higher than or equal to H, allocate, to the first application, a network channel that is of the at least two network channels and in which a relatively small quantity of communications link ports have been established; or when the level M of the first application is lower than H, allocate, to the first application, a network channel that is of the at least two network channels and in which a relatively large quantity of communications link ports have been established.

In the foregoing optional technical solutions, after it is determined that the first application has no specified network channel, according to whether the first application is a foreground application or a commonly used application, and the like, a network channel with highest channel quality is allocated to a foreground application and a commonly used application from the available network channel of the candidate network channel, and a network channel with lowest channel quality is allocated to an application that is neither a foreground application nor a commonly used application. This ensures data service quality of the foreground application and the commonly used application, and further improves user experience.

Optionally, based on the first aspect, after the target network channel is allocated to the first application, the method further includes: determining whether the target network channel is a restricted network channel of the first application; and if the target network channel is a restricted network channel of the first application, and the first application is a foreground application or the level M of the first application is higher than or equal to H, allocating, from the available network channel, a network channel with channel quality only second to the highest channel quality as a new target network channel of the first application; or if the target network channel is a restricted network channel of the first application, and the level M of the first application is lower than H, allocating, from the available network channel, a network channel with channel quality only higher than the lowest channel quality as a new target network channel of the first application.

Optionally, based on the second aspect, the judging module is further configured to determine whether the target network channel is a restricted network channel of the first application; and the allocation module is further specifically configured to: if the target network channel is a restricted network channel of the first application, and the first application is a foreground application or the level M of the first application is higher than or equal to H, allocate, from the available network channel, a network channel with channel quality only second to the highest channel quality as a new target network channel of the first application; or the allocation module is further specifically configured to: if the target network channel is a restricted network channel of the first application, and the level M of the first application is lower than H, allocate, from the available network channel, a network channel with channel quality only higher than the lowest channel quality as a new target network channel of the first application.

Optionally, based on the first aspect, after the determining whether the first application has a specified network channel, the method further includes: if the first application has a specified network channel, allocating the specified network channel as the target network channel of the first application.

Optionally, based on the second aspect, the allocation module is further configured to: if the first application has a specified network channel, allocate the specified network channel as the target network channel of the first application.

In the foregoing optional technical solutions, a target network channel meeting a requirement can be allocated to the first application when the first application has a restricted network channel or has a specified network channel. Therefore, a proper target network channel can be selected for the first application according to a user requirement, and user information security can be ensured, improving user experience.

Further, in the first aspect or the second aspect, when the target network channel is allocated to the first application from the candidate network channel according to the at least one attribute of the first application, whether the first application has a restricted network channel may alternatively be first determined. If the first application has a restricted network channel, and the candidate network channel includes the restricted network channel, the restricted network channel may be excluded from the candidate network channel, and then, the target network channel is allocated to the first application from the candidate network channel excluding the restricted network channel, according to whether the application has a specified network channel, whether the application is a foreground application, and an application priority level.

Optionally, based on the first aspect, before the allocating a target network channel from the candidate network channel to the first application, the method further includes: determining an application priority in a preset period according to an application use frequency and degree in the preset period; and determining network channel quality in a preset period according to a channel rate of a network channel in the preset period.

Optionally, based on the second aspect, the determining unit is further configured to determine an application priority in a preset period according to an application use frequency and degree in the preset period, and determine network channel quality in a preset period according to a channel rate of a network channel in the preset period.

In the foregoing optional technical solutions, the application priority in the preset period and the network channel quality in the preset period can be determined periodically. Therefore, the proper target network channel can be allocated to the first application in real time according to use habits of different users, improving user experience.

According to a third aspect, a terminal is provided, where the terminal includes a memory and a processor, the memory stores code and data, and the processor runs the code in the memory so that the terminal executes the network channel allocation method according to the first aspect.

The terminal provided in the embodiments of the present invention determines, based on the network request of the first application, the candidate network channel on which the communications link port is allowed to be established, and allocates the target network channel to the first application from the candidate network channel according to the at least one attribute of the first application and a specific preset policy, so that data services of different applications can be simultaneously transmitted on multiple network channels. In this way, the multiple network channels supported by the terminal are fully utilized, a transmission rate of the data services is also ensured, and an intermittent service stop caused by resource contention between the applications is avoided.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

Figure 1:
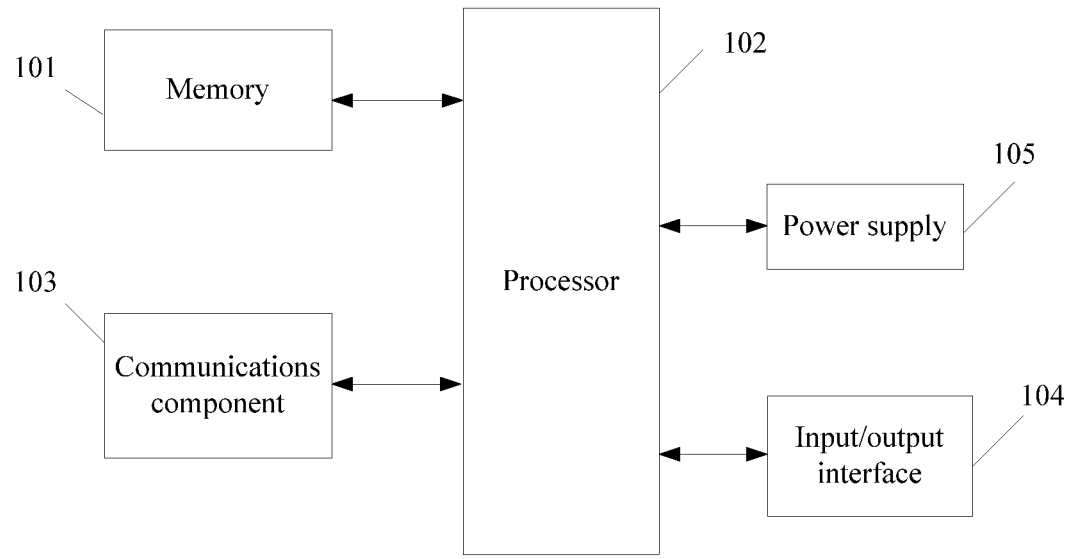
FIG. 1 is a schematic structural diagram of terminal hardware according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Technical terms in the present invention are first described before the present invention is described.

A network channel is a data communications device and manner. The network channel includes a device that starts data communication and a protocol and a transmission mode for communication. For example, a network channel for a smartphone includes a card channel and a WiFi channel. The card channel includes a SIM card, a communications standard (WCDMA, TD-SCDMA, and the like), and a related protocol. The WiFi channel includes a WiFi antenna, a WiFi communications protocol, and a WiFi channel.

A communications link is an actual link, on a network channel, that is used to perform data transmission. The communications link is generally duplex, and can be used to perform bidirectional data transmission. Generally, multiple data links can be established in one network channel.

A communications link port is an end of a communications link, or may be referred to as a socket. In this application, a quantity of communications link ports that can be established on a network channel is a quantity of sockets that can be established on the network channel.

A multi-channel terminal is a terminal simultaneously supporting multiple network channels, for example, a dual SIM dual standby mobile phone, a mobile phone simultaneously supporting 2G, 3G, and 4G networks, and a four-channel mobile phone. The four-channel mobile phone means that the mobile phone has an EVDO/GSM dual network dual standby function and supports a Chinese standard wireless function WAPI and an international WiFi standard.

EVDO is an abbreviation of three words: evolution, data only. The full name of EVDO is CDMA2000 1×EV-DO. EVDO is a stage of a path of CDMA2000 1× evolution (3G). The path has two development stages. The first stage is referred to as 1×EV-DO, that is, "data only". 1×EV-DO allows an operator to use a CDMA carrier with a bandwidth the same as that of IS-95 or CDMA2000 to achieve a forward data transmission rate of up to 2.4 Mbps. Currently, 1×EV-DO has been accepted by the International Telecommunication Union ITU as an international 3G standard, and has been ready for commercial use. The second stage is referred to as 1×EV-DV. 1×EV-DV can support both voice and data on a CDMA carrier.

A basic principle of the technical solutions provided in the embodiments of the present invention is: When a terminal supports multiple network channels simultaneously, that is, when the terminal is a multi-channel terminal, the multiple network channels are allocated to multiple applications according to a specific preset policy, so that data services of the multiple applications can be transmitted on the multiple network channels. Therefore, the multiple network channels are fully utilized, a transmission rate of the data services is also ensured, and an intermittent service stop caused by resource contention between the applications is avoided.

FIG. 1 is a schematic structural diagram of a terminal according to an embodiment of the present invention. The terminal may be a mobile phone, a tablet computer, a notebook computer, a ultra-mobile personal computer (UMPC), a netbook, a personal digital assistant (PDA), or another terminal device. This embodiment of the present invention is described by using an example in which the terminal is a mobile phone. FIG. 1 is a block diagram of a part of a mobile phone structure related to the embodiments of the present invention.

As shown in FIG. 1, the mobile phone includes components such as a memory 101, a processor 102, a communications component 103, an input/output interface 104, and a power supply 105. Persons skilled in the art can understand that the mobile phone structure shown in FIG. 1 does not constitute a limitation to the mobile phone. The mobile phone may include more or fewer components than those shown in the figure, or a combination of some components, or components disposed differently.

The following specifically describes each component of the mobile phone with reference to FIG. 1.

The memory 101 may be configured to store a software program and a module. The processor 102 runs the software program and the module stored in the memory 101, so as to execute various mobile phone function applications and process data. The memory 101 may mainly include a program storage area and a data storage area. The program storage area may store an operating system, an application program needed by at least one function, and the like. The data storage area may store data created according to use of the mobile phone, and the like. In addition, the memory 101 may include a high-speed random access memory, or may include a nonvolatile memory, such as at least one magnetic storage device, a flash memory device, or another volatile solid-state storage device.

The processor 102 is a control center of the mobile phone and is connected to various parts of the entire mobile phone by using various interfaces and lines, and executes various mobile phone functions and processes data by running or executing the software program and/or the module stored in the memory 101 and invoking data stored in the memory 101, so as to perform overall monitoring on the mobile phone. Optionally, the processor 102 may include one or more processing units. Preferably, an application processor and a modem processor may be integrated into the processor 102. The application processor mainly processes an operating system, a graphical user interface, an application program, and the like. The modem processor mainly processes wireless communication. It can be understood that the modem processor may alternatively be not integrated into the processor 102.

The communications component 103 is configured to facilitate wired or wireless communication between the mobile phone and another device. Optionally, the communications component may include an RF circuit 1031. Generally, the RF circuit 1031 includes but is not limited to an antenna, at least one amplifier, a transceiver, a coupler, a low noise amplifier (LNA), and a duplexer. In addition, the communications component 103 may further communicate with a network and another device by means of wireless communication. The wireless communication may use any communications standard or protocol, including but not limited to a Global System for Mobile Communications (GSM), a general packet radio service (GPRS), Code Division Multiple Access (CDMA), Wideband Code Division Multiple Access (WCDMA), Long Term Evolution (LTE), email, an SMS (Short Messaging Service), or WiFi. In an example of an embodiment, the communications component 103 receives, through a broadcast channel, a broadcast signal or broadcast-related information from an external broadcast management system. In an example of an embodiment, the communications component 103 further includes a WiFi (wireless fidelity) module, a Bluetooth module, an infrared module, and the like, to promote short-range communication.

The I/O interface 104 provides an interface between the processor 102 and a peripheral interface module. The peripheral interface module may be a keyboard, a click wheel, a button, and the like. The button may include but not limited to a home button, a volume button, a start button, and a lock button.

The power supply 105 supplies power to each component of the mobile phone. The power supply 105 may include a power management system, one or more power sources, and another component related to power generation, management, and distribution for the mobile phone.

In an example of an embodiment, the mobile phone may be implemented by one or more of an application-specific integrated circuit (ASIC), a digital signal processor (DSP), a digital signal processing device (DSPD), a programmable logic device (PLD), a field programmable gate array (FPGA), a controller, a microcontroller, a microprocessor, or another electronic element, so as to execute the foregoing method.

The mobile phone may further include a sensor component, an audio component, a multimedia component, and the like, although they are not shown. Details are not described herein.

Figure 2:
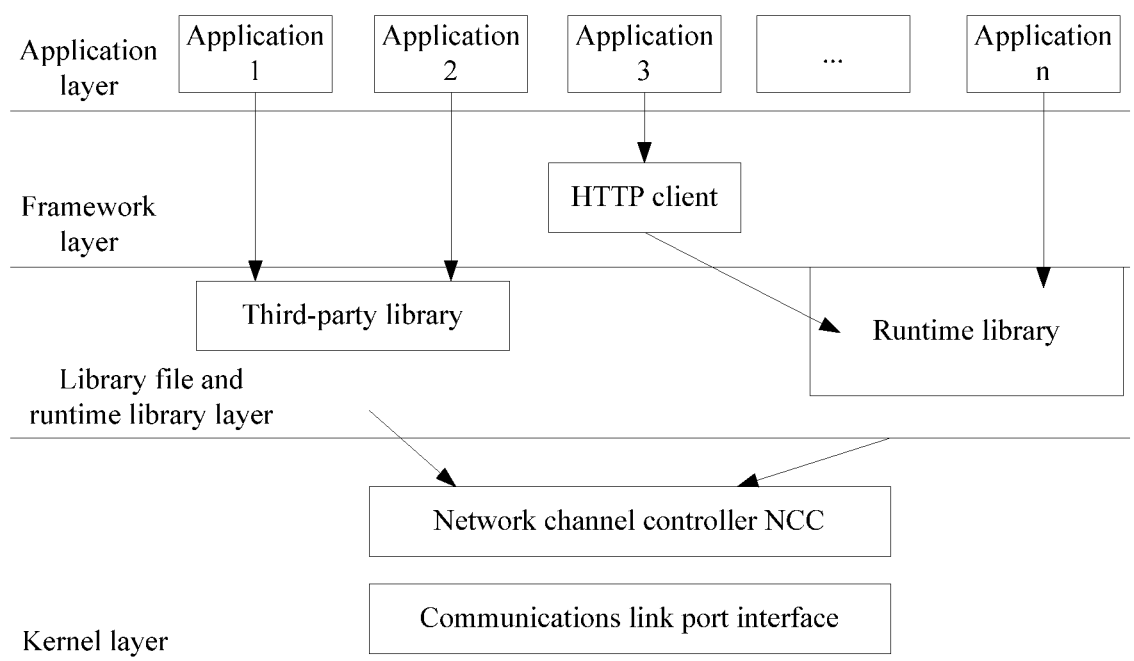
FIG. 2 is a schematic diagram of a terminal system architecture according to an embodiment of the present invention.

FIG. 2 is a terminal system architecture diagram according to an embodiment of the present invention. The system architecture diagram is based on the terminal using a hardware structure shown in FIG. 1. As shown in FIG. 2, the system architecture includes an application layer, a framework layer, a library file and runtime library layer, and a kernel layer.

In this embodiment of the present invention, the application layer is a layer at which all applications are located. The applications may send a network request to a lower layer. The network request may include three forms: an HTTP (Hyper Text Transfer Protocol) client request, a third-party library request, and a runtime library request. An HTTP client is located at the framework layer, and the framework layer is an interface responsible for providing an HTTP request and response. The library file and runtime library layer may interact with the kernel layer. The library file and runtime library layer receives a request from the upper framework layer or application layer, and calls a lower-layer interface to create a socket. The kernel layer includes a network channel controller (NCC) and a socket interface. The NCC is responsible for receiving a socket creation request from an upper layer, and allocates the request to a proper socket by using an NCC algorithm. For example, for a mobile phone, the socket may be established on a network channel on a SIM card, or may be established in a WiFi network channel. The NCC is located between the library file and runtime library layer and the socket interface.

Figure 3:
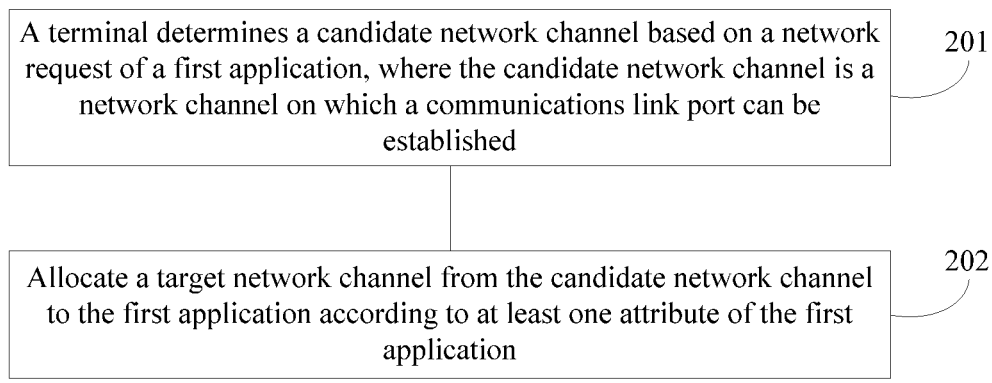
FIG. 3 is a schematic flowchart of a network channel allocation method according to an embodiment of the present invention.

FIG. 3 is a schematic flowchart of a network channel allocation method according to an embodiment of the present invention. Referring to FIG. 3, the method includes the following several steps.

Step 201. A terminal determines a candidate network channel based on a network request of a first application, where the candidate network channel is a network channel on which a communications link port can be established.

The terminal includes at least the first application, and may further include multiple other applications. The first application or the other applications may be third-party application programs installed on the terminal, or may be applications, processes, or the like in a system of the terminal. The network request of the first application may be an HTTP client request, a third-party library request, and/or a runtime library request. That is, the network request of the first application may be an HTTP client request that is sent by the application layer to the framework layer in FIG. 2, and/or a third-party library request or a runtime library request that is sent by the application layer to the library file and runtime library layer in FIG. 2.

In addition, that the candidate network channel is a network channel on which a communications link port can be established means that the candidate network channel may be a network channel on which no communications link port is established, that is, all communications link ports are idle, or may be a network channel that does not reach a saturated state, that is, a network channel on which some communications link ports have been established and a new communications link port can further be established. The saturated state means that a quantity of data links that have been established on the network channel has reached the maximum.

It should be noted that the candidate network channel is a network channel that is of multiple network channels supported by the terminal and on which a communications link port can be established currently. The terminal may be a multi-channel terminal. The multiple network channels may be network channels of a same type, or may be network channels of different types.

Specifically, when the terminal determines the candidate network channel based on the network request of the first application, the terminal may determine, as the candidate network channel, a network channel in an unsaturated state from a network channel that is currently enabled by the terminal.

Further, before the terminal determines the candidate network channel based on the network request of the first application, the terminal may enable the multiple supported network channels or some supported network channels during power-on. The specific enabled network channel may be set by a user, or may be set by default in the system. This is not limited in this embodiment of the present invention.

For example, the terminal is a multi-channel terminal, and a total of five network channels are enabled when the terminal is powered on. When the terminal determines the candidate network channel based on the network request of the first application, among the five network channels, one network channel has reached the saturated state, three network channels do not reach the saturated state though a communications link port has been established, and the remaining one network channel has no established communications link port. Therefore, the candidate network channel determined by the terminal is the one network channel on which no communications link is established and the three network channels on which a communications link port has been established and that do not reach the saturated state, that is, a total of four network channels.

Step 202. The terminal allocates a target network channel from the candidate network channel to the first application according to at least one attribute of the first application, where the at least one attribute includes: whether an application has a specified network channel, whether an application is a foreground application, an application priority level, and whether an application has a restricted network channel.

The terminal may allocate the target network channel from the candidate network channel to the first application according to the at least one attribute of the first application, so that multiple network channels of the candidate network channel can be allocated to multiple different applications, and the multiple network channels are fully utilized. This avoids an intermittent service stop caused by resource contention when data services of the multiple applications are transmitted on a same network channel.

In addition, the step of allocating, by the terminal, a target network channel from the candidate network channel to the first application according to at least one attribute of the first application may be performed by the network channel controller NCC at the kernel layer in FIG. 2.

Figure 4:
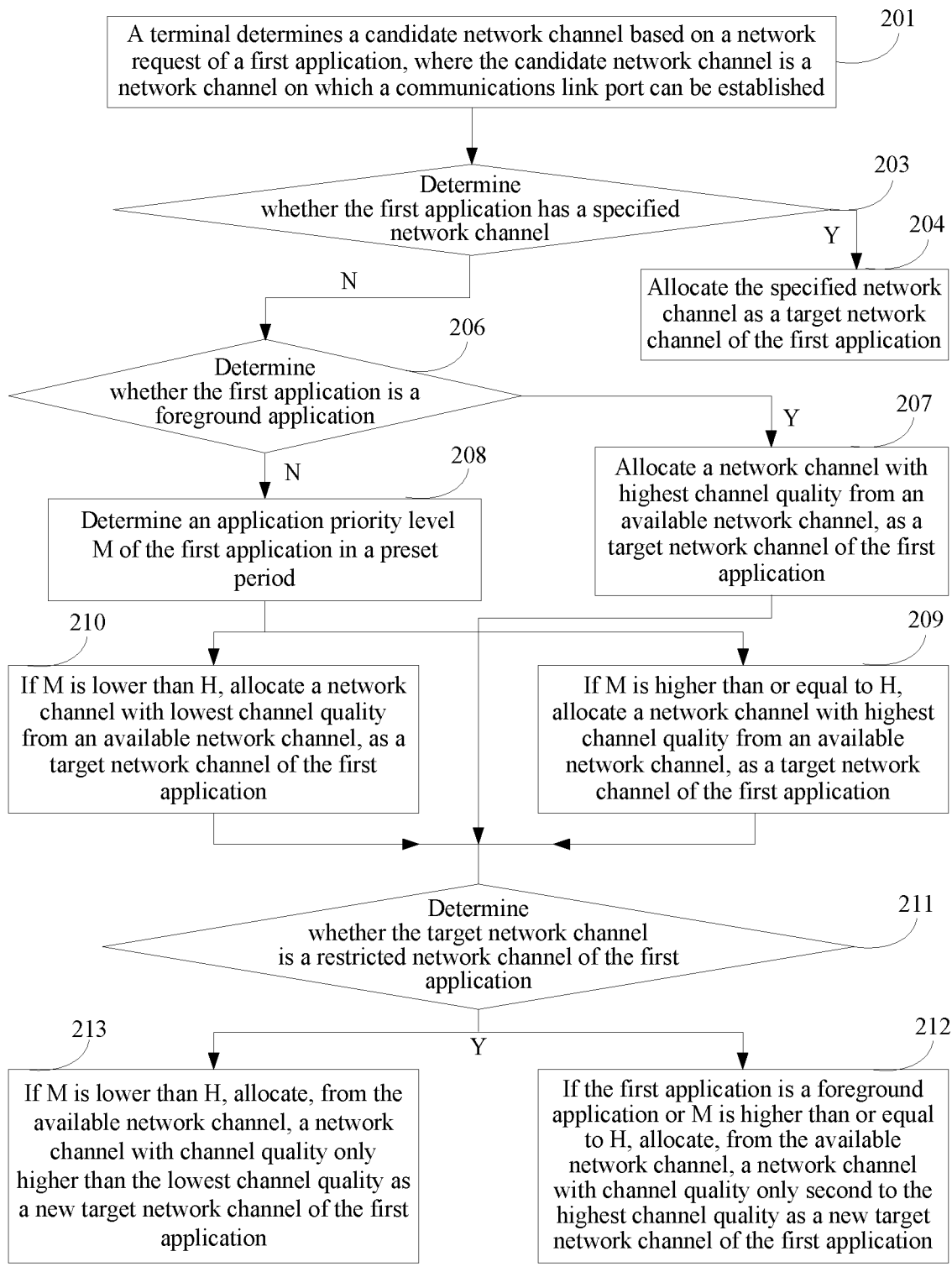
FIG. 4 is a schematic flowchart of another network channel allocation method according to an embodiment of the present invention.

Further, as shown in FIG. 4, the terminal may implement, by using a method in the following steps 203 and 204, the allocating a target network channel from the candidate network channel to the first application according to at least one attribute of the first application. Details are as follows.

Step 203. Determine whether the first application has a specified network channel.

The specified network channel may be set in advance, and may be set by the user, or may be set by default in the system. For example, a smartphone is used as an example. For some payment type applications, to protect user information security, these types of application are set by a user or by a system by default to use only a SIM card network channel. For some traffic-consuming data download type applications, to save network traffic, these types of application may be set to use only a WiFi network channel for data download.

Specifically, when the terminal allocates the target network channel to the first application, the terminal may first determine whether the first application has the specified network channel. When the first application has the specified network channel, step 204 is performed. When the first application does not have the specified network channel, step 205 is performed. In this way, the proper target network channel can be allocated to the first application according to user requirements or different system default settings, and further user experience is improved.

Step 204. If the first application has a specified network channel, allocate the specified network channel as the target network channel of the first application.

Step 205. If the first application has no specified network channel, allocate the target network channel from an available network channel of the candidate network channel to the first application.

The available network channel is a network channel on which a communications link port can be established and that is still included in the candidate network channel after a target network channel is allocated to a second application. The second application is any application to which the target network channel has been allocated.

Because each of the candidate network channel has limited resources, after the terminal allocates the target network channel to the second application, the target network channel of the second application may not reach the saturated state, or may have reached the saturated state. When the target network channel of the second application does not reach the saturated state, the target network channel is still an available network channel and can be further allocated. When the target network channel of the second application reaches the saturated state, the target network channel is referred to as an unavailable network channel and cannot be further allocated. Therefore, when the terminal allocates the target network channel to the first application, the terminal may allocate the target network channel from the available network channel of the candidate network channel.

It should be noted that the candidate network channel includes an available network channel and an unavailable network channel, and the resources of the available network channel are less than or equal to the resources of the candidate network channel. When the second application does not exist, or the target network channel of the second application does not reach the saturated state, that is, there is no unavailable network channel in the candidate network channel, the resources of the available network channel is equal to the resources of the candidate network channel.

For example, the candidate network channel includes 10 network channels. When the terminal allocates a target network channel to each of five applications, if one of the 10 network channels reaches the saturated state after the terminal allocates target network channels to two of the five applications, the terminal cannot allocate target network channels from the network channel in the saturated state to the remaining three applications, but can allocate only from the remaining nine network channels.

Further, the terminal may implement, by using a method in the following steps 206 to 210, the allocating the target network channel from an available network channel of the candidate network channel to the first application. Details are as follows.

Step 206. Determine whether the first application is a foreground application.

If the first application is a foreground application, step 207 is performed. If the first application is not a foreground application, steps 208 to 210 are performed.

Step 207. If the first application is a foreground application, allocate, according to channel quality of the available network channel in the corresponding preset period, a network channel with highest channel quality from the available network channel as the target network channel of the first application.

When the terminal determines that the first application is a foreground application, it indicates that the first application is an application currently being used by the user. To ensure communication quality of the first application, the terminal may allocate, according to the channel quality of the available network channel in the corresponding preset period, the network channel with the highest channel quality from the available network channel as the target network channel of the first application.

For example, if the first application is a foreground application, available network channels include C1-C5. If channel quality of the C1-C5 in a corresponding preset period is successively C1, C5, C4, C2, and C3 in descending order, the network channel C1 with the highest channel quality is allocated as the target network channel of the first application.

The channel quality in the preset period may be determined according to a channel rate of the network channel in the preset period. A higher channel rate indicates higher channel quality. For example, for network channels corresponding to WiFi, 2G, and 3G, if channel rates are successively WiFi, 3G, and 2G in descending order, corresponding channel quality is also successively WiFi, 3G, and 2G in descending order.

Specifically, a method for collecting, by the terminal, the channel rate of the network channel in the preset period may be: For each network channel in the preset period, if a channel rate of the network channel is collected for the first time, the terminal reads a quantity of bytes transmitted through the network channel and duration spent in transmitting the bytes, and the channel rate of the network channel is equal to a rate of the quantity of transmitted bytes to the spent duration. If a channel rate of the network channel is collected not for the first time, the terminal reads, at specified intervals, a quantity of bytes transmitted through the network channel and duration spent in transmitting the bytes, and calculates the channel rate. When a quantity of statistics times reaches N, the terminal determines an average value of channel rates collected at N times, as a final channel rate of the network channel.

Optionally, the terminal may further determine the channel quality in the preset period according to the channel rate and fluctuations of channel rates in different preset periods. Specifically, a higher but less fluctuating channel rate of a network channel indicates higher channel quality of the network channel. A lower but more fluctuating channel rate of a network channel indicates lower channel quality of the network channel.

Further, if the network channel with the highest channel quality in the available network channel includes at least two network channels, that is, the target network channel allocated to the first application according to step 207 includes at least two network channels, a network channel that is of the at least two network channels and in which a relatively small quantity of communications link ports have been established is allocated to the first application.

A network channel has limited resources. If a quantity of communications link ports that have been established is larger, it can be determined that the network channel has fewer remaining resources. If a quantity of communications link ports that have been established is smaller, it can be determined that the network channel has more remaining resources. Because the first application is an important application or a commonly used application, the network channel that is of the at least two network channels and in which the relatively small quantity of communications link ports have been established is allocated to the first application.

Step 208. If the first application is not a foreground application, determine an application priority level M of the first application in a preset period.

When the first application is not a foreground application, whether the first application is an important application or a commonly used application may be determined. Therefore, the terminal may first determine the application priority level M of the first application in the preset period, and then determine, according to M, whether the first application is an important application or a commonly used application.

The application priority in the preset period may be determined according to an application use frequency and degree in the preset period. Specifically, the application priority in the preset period is directly proportional to the application use frequency and degree in the preset period, that is, a greater use frequency and degree indicates a higher application priority. The use frequency and degree may be use frequency, that is, times that an application is moved to a foreground in the preset period. Alternatively, the use frequency and degree is use duration, that is, accumulated duration in which an application runs in a foreground in the preset period.

For example, when the use frequency and degree is use frequency, if applications used in the preset period include applications 1 to 5, and use frequencies of the applications 1 to 5 are successively 5, 9, 15, 2, and 6, application priorities are successively the application 3, the application 2, the application 5, the application 1, and the application 4 in descending order. Correspondingly, application priority levels may be level 1 to level 5 in descending order. If the first application is the application 3, the first application has a highest application priority level, level 1. If the first application is the application 4, the first application has a lowest application priority level, level 5.

Optionally, when the use frequency and degree is use duration, a method for collecting, by the terminal, the application use duration in the preset period may be: When the user starts the application and runs it in the foreground, a start time point is recorded. When the user exits the application or runs the application in a background, a stop time point is recorded. In addition, times at which a screen is turned on and turned off in the preset period are separately collected. Then, the time point at which the application is started is subtracted from the time point at which the application exits, to obtain total duration. An accumulated screen off time in this duration is calculated, and a method is subtracting the screen off time point from the screen on time point. The screen on time point and the screen off time point may divide an application use time into several periods. Screen off periods are added up to obtain screen off duration. Finally, the screen off duration is subtracted from the total duration, to obtain the application use duration in the preset period.

It should be noted that there is a valid statistical period, that is, a statistical period, for collecting, by the terminal, the application use duration in the preset period. For example, the statistical period is set to 18 hours. If there are more than 18 hours between the stop time point and the start time point of the application, application use duration in this start and exit is not collected.

Step 209. If M is higher than or equal to a preset level H, allocate, according to channel quality of the available network channel in the corresponding preset period, a network channel with highest channel quality from the available network channel as the target network channel of the first application.

When the level M of the first application is higher than or equal to the preset level H, the terminal may determine that importance of the first application is relatively high, or that the first application is a commonly used application, and therefore, allocate, according to the channel quality of the available network channel in the corresponding preset period, the network channel with the highest channel quality from the available network channel as the target network channel of the first application.

It should be noted that the preset level H may be set in advance, and the preset level H is an application priority level in the preset period. In an actual application, the preset level may alternatively be represented by using another parameter. Optionally, the level M of the first application may be a ranking of the first application among application priorities ranked according to use frequency, and the preset level H may be a specified ranking. Therefore, an application ranking before H or at H is an important application or a commonly used application. For example, when the application priority in the preset period are corresponding to 20 applications, first 10 applications may be set as important applications or commonly used applications according to a descending order of priority.

Optionally, an application whose application priority in the preset period is higher than or equal to the preset level H is stored independently. When whether the first application is an important application or a commonly used application is determined, it is only required to determine whether the first application is an independently stored application. If the first application is an independently stored application, the network channel with the highest channel quality in the available network channel is allocated as the target network channel of the first application.

Further, if the network channel with the highest channel quality in the available network channel includes at least two network channels, that is, the target network channel allocated to the first application according to step 209 includes at least two network channels, a network channel that is of the at least two network channels and in which a relatively small quantity of communications link ports have been established is allocated to the first application.

Step 210. If M is lower than a preset level, allocate, according to channel quality of the available network channel in the corresponding preset period, a network channel with lowest channel quality from the available network channel as the target network channel of the first application.

When the level M of the first application is lower than the preset level H, the terminal may determine that importance of the first application is relatively low, or that the first application is not a commonly used application, and therefore, allocate, according to the channel quality of the available network channel in the corresponding preset period, the network channel with the lowest channel quality from the available network channel as the target network channel of the first application.

Further, if the network channel with the lowest channel quality in the available network channel includes at least two network channels, that is, the target network channel allocated to the first application according to step 210 includes at least two network channels, a network channel that is of the at least two network channels and in which a relatively large quantity of communications link ports have been established is allocated to the first application.

A network channel has limited resources. If a quantity of communications link ports that have been established is larger, it can be determined that there are fewer remaining resources on the network channel. If a quantity of communications link ports that have been established is smaller, it can be determined that there are more remaining resources on the network channel. Therefore, when the level M of the first application is lower than the preset level H, the network channel that is of the at least two network channels and in which the relatively small quantity of communications link ports have been established is allocated to the first application.

Further, after the terminal allocates the target network channel to the first application, the method further includes steps 211 to 213.

Step 211. Determine whether the target network channel is a restricted network channel of the first application.

After allocating a target network channel to the first application, the terminal may determine whether the target network channel is a restricted network channel of the first application. If the target network channel is a restricted network channel, step 212 is performed when the first application is a foreground application or the level M of the first application is higher than or equal to H, or step 213 is performed when the level M of the first application is lower than H.

Step 212. If the target network channel is a restricted network channel of the first application, and the first application is a foreground application or the level M of the first application is higher than or equal to H, allocate, from the available network channel, a network channel with channel quality only second to the highest channel quality as a new target network channel of the first application.

The restricted network channel may be set in advance, may be set by the user, or may be set by default in the system. For example, for some payment type applications, or a communication type application such as an important email and information, to protect user information security, a WiFi network channel cannot be used. Therefore, the WiFi network channel may be set as a restricted network channel of the payment type applications or the important communication type application.

Specifically, when the target network channel is the restricted network channel of the first application, and the importance of the first application is relatively high, the network channel with the channel quality only second to the highest channel quality in the available network channel may be allocated as the new target network channel of the first application according to the channel quality, of the available network channel, ranked in descending order.

For example, the channel quality of the available network channel is successively WiFi, 4G, 3G, and 2G in descending order, the first application is a payment type application, and the target network channel allocated to the first application is the WiFi network channel. Because the WiFi network channel is the restricted network channel of the first application, the 4G network channel is allocated as the new target network channel of the first application according to the channel quality, of the available network channel, ranked in descending order.

Step 213. If the target network channel is a restricted network channel of the first application, and the level M of the first application is lower than H, allocate, from the available network channel, a network channel with channel quality only higher than the lowest channel quality as a new target network channel of the first application.

Specifically, when the target network channel is the restricted network channel of the first application, and the importance of the first application is relatively low, the network channel with the channel quality only higher than the lowest channel quality in the available network channel may be allocated as the new target network channel of the first application according to the channel quality, of the available network channel, ranked in ascending order.

For example, the channel quality of the available network channel is successively 2G, 3G, 4G, and WiFi in ascending order, the target network channel allocated by the terminal to the first application is the 2G network channel, and the restricted network channel of the first application is also the 2G network channel. Therefore, the 3G network channel is allocated as the new target network channel of the first application according to the channel quality, of the available network channel, ranked in ascending order.

Further, when the terminal allocates the target network channel from the candidate network channel to the first application according to the at least one attribute of the first application, the terminal may alternatively first determine whether the first application has a restricted network channel. If the first application has a restricted network channel, and the candidate network channel includes the restricted network channel, the terminal may exclude the restricted network channel from the candidate network channel, and then allocate, according to the method in steps 203 to 210, the target network channel to the first application from the candidate network channel excluding the restricted network channel. For details, refer to the foregoing steps 203 to 210. Details are not repeated herein in this embodiment of the present invention.

Further, after the terminal allocates the target network channel to the first application, the terminal may increase a corresponding quantity of communications link ports established in the target network channel by one, so as to collect a quantity of communications link ports that have been established in the target network channel. Therefore, if the target network channel allocated to the first application has at least two network channels with same channel quality, a proper network channel is allocated to the first application according to whether the first application is an important application or a commonly used application, and a quantity of communications link ports that have been established in each of the at least two network channels.

Further, after the terminal allocates the target network channel to the first application according to steps 201 to 213, the terminal may establish a communications link port, that is, establish a socket, bind the communications link port to the target network channel, and then transmit a data service on the target network channel. For a method of establishing, by the terminal, a communications link port and binding the communications link port to the target network channel, refer to the prior art. This is not detailed in this embodiment of the present invention.

According to the network channel allocation method provided in this embodiment of the present invention, the candidate network channel is determined based on the network request of the first application, where the candidate network channel includes the network channel on which the communications link port can be established; the target network channel is allocated to the first application from the candidate network channel according to the at least one attribute of the first application and a specific preset policy, so that data services of different applications can be simultaneously transmitted on multiple network channels. In this way, the multiple network channels supported by the terminal are fully utilized, a transmission rate of the data services is also ensured, and an intermittent service stop caused by resource contention between the applications is avoided.

Figure 5:
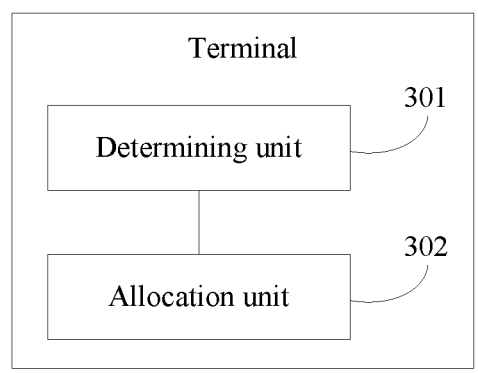
FIG. 5 is a schematic structural diagram of a network channel allocation apparatus according to an embodiment of the present invention.

FIG. 5 is a schematic structural diagram of a network channel allocation apparatus according to an embodiment of the present invention. Referring to FIG. 5, the apparatus includes a determining unit 301 and an allocation unit 302.

The determining unit 301 is configured to determine a candidate network channel based on a network request of a first application, where the candidate network channel includes a network channel on which a communications link port can be established.

The allocation unit 302 is configured to allocate a target network channel from the candidate network channel to the first application according to at least one attribute of the first application, where the at least one attribute includes: whether an application has a specified network channel, whether an application is a foreground application, an application priority level, and whether an application has a restricted network channel.

Figure 6:
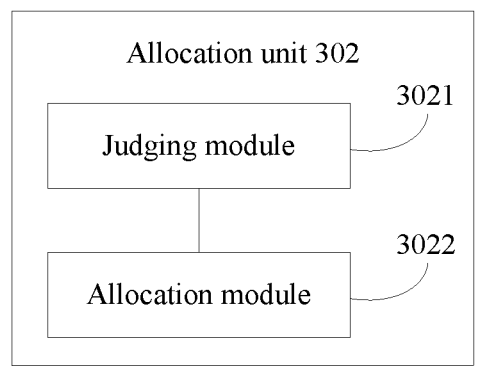
FIG. 6 is a schematic structural diagram of an allocation unit according to an embodiment of the present invention.

Optionally, referring to FIG. 6, the allocation unit 302 includes a judging module 3021 and an allocation module 3022.

The judging module 3021 is configured to determine whether the first application has a specified network channel.

The allocation module 3022 is configured to: if the first application has no specified network channel, allocate the target network channel from an available network channel of the candidate network channel to the first application, where the available network channel is a network channel on which a communications link port can be established and that is still included in the candidate network channel after a target network channel is allocated to a second application.

Optionally, the judging module 3021 is further configured to determine whether the first application is a foreground application; and the allocation module 3022 is further configured to: if the first application is a foreground application, allocate, according to channel quality of the available network channel in the corresponding preset period, a network channel with highest channel quality from the available network channel as the target network channel of the first application.

Figure 7:
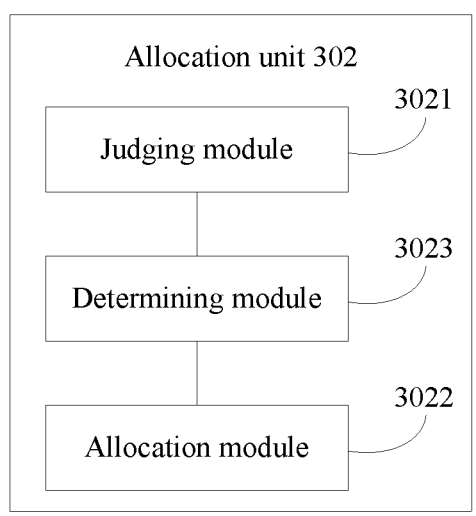
FIG. 7 is a schematic structural diagram of another allocation unit according to an embodiment of the present invention.

Optionally, referring to FIG. 7, the allocation unit 302 further includes a determining module 3023.

The determining module 3023 is configured to: if the first application is not a foreground application, determine an application priority level M of the first application in a preset period; and the allocation module 3022 is further configured to: if M is higher than or equal to a preset level H, allocate, according to channel quality of the available network channel in the corresponding preset period, a network channel with highest channel quality from the available network channel as the target network channel of the first application; or the allocation module 3022 is further configured to: if M is lower than a preset level, allocate, according to channel quality of the available network channel in the corresponding preset period, a network channel with lowest channel quality from the available network channel as the target network channel of the first application.

In another embodiment of the present invention, if the target network channel includes at least two network channels, the allocation module 3022 is further configured to: when the first application is a foreground application or the level M of the first application is higher than or equal to H, allocate, to the first application, a network channel that is of the at least two network channels and in which a relatively small quantity of communications link ports have been established; or when the level M of the first application is lower than H, allocate, to the first application, a network channel that is of the at least two network channels and in which a relatively large quantity of communications link ports have been established.

In another embodiment of the present invention, the judging module 3021 is further configured to determine whether the target network channel is a restricted network channel of the first application; and the allocation module 3022 is further configured to: if the target network channel is a restricted network channel of the first application, and the first application is a foreground application or the level M of the first application is higher than or equal to H, allocate, from the available network channel, a network channel with channel quality only second to the highest channel quality as a new target network channel of the first application; or the allocation module 3022 is further configured to: if the target network channel is a restricted network channel of the first application, and the level M of the first application is lower than H, allocate, from the available network channel, a network channel with channel quality only higher than the lowest channel quality as a new target network channel of the first application.

In another embodiment of the present invention, the allocation module 3022 is further configured to: if the first application has a specified network channel, allocate the specified network channel as the target network channel of the first application.

Optionally, the determining unit 301 is further configured to determine an application priority in the preset period according to an application use frequency and degree in the preset period, and determine network channel quality in the preset period according to a channel rate of a network channel in the preset period.

The network channel allocation apparatus provided in this embodiment of the present invention determines the candidate network channel based on the network request of the first application, where the candidate network channel includes the network channel on which the communications link port can be established; and allocates the target network channel to the first application from the candidate network channel according to the at least one attribute of the first application and a specific preset policy, so that data services of different applications can be simultaneously transmitted on multiple network channels. In this way, the multiple network channels supported by the apparatus are fully utilized, a transmission rate of the data services is also ensured, and an intermittent service stop caused by resource contention between the applications is avoided.

An embodiment of the present invention provides a terminal. Referring to FIG. 1, the terminal includes components such as a memory 101, a processor 102, a communications component 103, an input/output interface 104, and a power supply 105. The memory 101 stores code and data. The processor 102 runs the code in the memory 101, so that the terminal executes the network channel allocation method in the embodiment shown in FIG. 3 or FIG. 4.

Specifically, when the processor 102 executes the network channel allocation method in the embodiment shown in FIG. 3 or FIG. 4, the processor 102 is configured to: determine a candidate network channel based on a network request of a first application, where the candidate network channel includes a network channel on which a communications link port can be established; and allocate a target network channel from the candidate network channel to the first application according to at least one attribute of the first application, where the at least one attribute includes: whether an application has a specified network channel, whether an application is a foreground application, an application priority level, and whether an application has a restricted network channel.

Optionally, the processor 102 is specifically configured to: determine whether the first application has a specified network channel; and if the first application has no specified network channel, allocate the target network channel from an available network channel of the candidate network channel to the first application, where the available network channel is a network channel on which a communications link port can be established and that is still included in the candidate network channel after a target network channel is allocated to a second application.

Optionally, the processor 102 is further specifically configured to determine whether the first application is a foreground application; and the processor 102 is further specifically configured to: if the first application is a foreground application, allocate, according to channel quality of the available network channel in the corresponding preset period, a network channel with highest channel quality from the available network channel as the target network channel of the first application.

Optionally, the processor 102 is further specifically configured to: if the first application is not a foreground application, determine an application priority level M of the first application in a preset period; and the processor 102 is further specifically configured to: if M is higher than or equal to a preset level H, allocate, according to channel quality of the available network channel in the corresponding preset period, a network channel with highest channel quality from the available network channel as the target network channel of the first application; or the processor 102 is further specifically configured to: if M is lower than a preset level, allocate, according to channel quality of the available network channel in the corresponding preset period, a network channel with lowest channel quality from the available network channel as the target network channel of the first application.

In another embodiment of the present invention, if the target network channel includes at least two network channels, the processor 102 is further configured to: when the first application is a foreground application or the level M of the first application is higher than or equal to H, allocate, to the first application, a network channel that is of the at least two network channels and in which a relatively small quantity of communications link ports have been established; or when the level M of the first application is lower than H, allocate, to the first application, a network channel that is of the at least two network channels and in which a relatively large quantity of communications link ports have been established.

In another embodiment of the present invention, the processor 102 is further specifically configured to determine whether the target network channel is a restricted network channel of the first application; and the processor 102 is further specifically configured to: if the target network channel is a restricted network channel of the first application, and the first application is a foreground application or the level M of the first application is higher than or equal to H, allocate, from the available network channel, a network channel with channel quality only second to the highest channel quality as a new target network channel of the first application; or the processor 102 is further specifically configured to: if the target network channel is a restricted network channel of the first application, and the level M of the first application is lower than H, allocate, from the available network channel, a network channel with channel quality only higher than the lowest channel quality as a new target network channel of the first application.

In another embodiment of the present invention, the processor 102 is further specifically configured to: if the first application has a specified network channel, allocate the specified network channel as the target network channel of the first application.

Optionally, the processor 102 is further specifically configured to determine an application priority in the preset period according to an application use frequency and degree in the preset period, and determine network channel quality in the preset period according to a channel rate of a network channel in the preset period.

The terminal provided in this embodiment of the present invention determines the candidate network channel based on the network request of the first application, where the candidate network channel includes the network channel on which the communications link port can be established; and allocates the target network channel to the first application from the candidate network channel according to the at least one attribute of the first application and a specific preset policy, so that data services of different applications can be simultaneously transmitted on multiple network channels. In this way, the multiple network channels supported by the terminal are fully utilized, a transmission rate of the data services is also ensured, and an intermittent service stop caused by resource contention between the applications is avoided.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions in the embodiments of the present invention.

The invention claimed is:

1. A network channel allocation method comprises:
   determining, by a multi-channel terminal supporting multiple network channels simultaneously, among a number of network channels, candidate network channels based on a network request of a first application, wherein the candidate network channels are second network channels on a second network on which a communications link port is allowed to be established that is different from a first network channel on a first network over which traffic is sent by default by the terminal, wherein the second network is different from the first network, and wherein the second channels are network on which a communications link port has been established and do not reach a saturated state; and
   allocating, by the terminal, a target network channel from the candidate network channel to the first application according to an attribute of the first application, wherein the attribute comprises: whether an application has a specified network channel, whether an application is a foreground application, an application priority level, or whether an application has a restricted network channel;
   wherein the allocating, by the terminal, a target network channel from the candidate network channels to the first application according to the attributes of the first application comprises:
   determining, by the terminal, whether the first application has a specified network channel; and allocating, by the terminal, according to a determination that the first application has no specified network channel, the target network channel from an available network channel of the candidate network channels to the first application, wherein the available network channel is a network channel on which a communications link port is allowed to be established and that is still comprised in the candidate network channels after a target network channel is allocated to a second application.

2. The method according to claim 1, wherein allocating the target network channel from the available network channel comprises:
  determining whether the first application is a foreground application; and
  in response to determining that the first application is a foreground application, allocating, according to channel quality of the available network channel in a corresponding preset period, a network channel with highest channel quality from the available network channel, as the target network channel of the first application.

3. The method according to claim 1, wherein after the determining whether the first application has a specified network channel, the method further comprises:
  in response to determining that the first application has a specified network channel, allocating the specified network channel as the target network channel of the first application.

4. The method according to claim 1, wherein before allocating the target network channel from the candidate network channel to the first application, the method further comprises:
  determining an application priority in a preset period according to an application use frequency and degree in the preset period; and
  determining network channel quality in a preset period according to a channel rate of a network channel in the preset period.

5. The method according to claim 2, wherein after determining whether the first application is the foreground application, the method further comprises:
  in response to determining that the first application is not the foreground application, determining an application priority level M of the first application in a preset period; and
  in response to determining that the application priority level M is higher than or equal to a preset level H, allocating, according to channel quality of the available network channel in the corresponding preset period, a network channel with highest channel quality from the available network channel, as the target network channel of the first application.

6. The method according to claim 2, wherein after determining whether the first application is the foreground application, the method further comprises:
  in response to determining that the first application is not the foreground application, determining an application priority level M of the first application in a preset period; and
  in response to determining that the application priority level M is lower than a preset level H, allocating, according to channel quality of the available network channel in the corresponding preset period, a network channel with lowest channel quality from the available network channel, as the target network channel of the first application.

7. The method according to claim 2, further comprising:
  in response to determining that the target network channel comprises a plurality of network channels, when the first application is the foreground application or an application priority level M of the first application is higher than or equal to a preset level H, allocating, to the first application, a network channel from the plurality of network channels, wherein a quantity of communications link ports on the allocated network channel is less than a quantity of communications link ports on another network channel from the plurality of network channel.

8. The method according to claim 2, further comprising:
  in response to determining that the target network channel comprises a plurality of network channels, when an application priority level M of the first application is lower than a preset level H, allocating, to the first application, a network channel from the plurality of network channels, wherein a quantity of communications link ports on the allocated network channel is less than a quantity of communications link ports on another network channel from the plurality of network channel.

9. The method according to claim 5, wherein after allocating the target network channel to the first application, the method further comprises:
  determining whether the target network channel is the restricted network channel of the first application; and
  in response to determining that the target network channel is the restricted network channel of the first application, and the first application is the foreground application or the application priority level M of the first application is higher than or equal to the preset level H, allocating, from the available network channel, a network channel with channel quality only second to the highest channel quality as a new target network channel of the first application.

10. The method according to claim 5, wherein after allocating the target network channel to the first application, the method further comprises:
  determining whether the target network channel is the restricted network channel of the first application; and
  in response to determining that the target network channel is the restricted network channel of the first application, and the application priority level M of the first application is lower than the preset level H, allocating, from the available network channel, a network channel with channel quality only higher than the lowest channel quality as a new target network channel of the first application.

11. A terminal comprising:
  a processor;
  a memory storing a program to be executed in the processor, the program comprising instruction when executed cause the processor to:
    determine, among a number of network channels, candidate network channels based on a network request of a first application, wherein the candidate network channels are second network channels on a second network on which a communications link port is allowed to be established that is different from a first network channel on a first network over which traffic is sent by default by the terminal, wherein the second network is different from the first network, and wherein the second channels are network on which a communications link port has been established and do not reach a saturated state; and allocate a target network channel from the candidate network channel to the first application according to an attribute of the first application, wherein the attribute comprises: whether an application has a specified network channel, whether an application is a foreground application, an application priority level, or whether an application has a restricted network channel;

wherein the allocating, by the terminal, a target network channel from the candidate network channels to the first application according to the attributes of the first application comprises:

determining, by the terminal, whether the first application has a specified network channel; and allocating, by the terminal, according to a determination that the first application has no specified network channel, the target network channel from an available network channel of the candidate network channels to the first application, wherein the available network channel is a network channel on which a communications link port is allowed to be established and that is still comprised in the candidate network channels after a target network channel is allocated to a second application.

12. The terminal according to claim 11, wherein the program comprises further instructions that cause the processor to:

determine whether the first application is the foreground application; and in response to determining that the first application is the foreground application, allocate a network channel with highest channel quality from the available network channel, according to channel quality of the available network channel in a corresponding preset period, as the target network channel of the first application.

13. The terminal according to claim 12, wherein after determining whether the first application is the foreground application, the program comprises further instructions that cause the processor to:

in response to determining that the first application is not the foreground application, determining an application priority level M of the first application in a preset period; and in response to determining that the application priority level M is lower than a preset level H, allocating, according to channel quality of the available network channel in the corresponding preset period, a network channel with lowest channel quality from the available network channel, as the target network channel of the first application.

14. The terminal according to claim 12, wherein in response to determining that the target network channel comprises a plurality of network channels, the program comprises further instructions that cause the processor to:

when the first application is the foreground application or an application priority level M of the first application is higher than or equal to a preset level H, allocating, to the first application, a network channel from the plurality of network channels, wherein a quantity of communications link ports on the allocated network channel is less than a quantity of communications link ports on another network channel from the plurality of network channel.

15. The terminal according to claim 12, wherein in response to determining that the target network channel comprises a plurality of network channels, the program comprises further instructions that cause the processor to:

when an application priority level M of the first application is lower than a preset level H, allocating, to the first application, a network channel from the plurality of network channels, wherein a quantity of communications link ports on the allocated network channel is less than a quantity of communications link ports on another network channel from the plurality of network channel.

16. The terminal according to claim 12, wherein after determining whether the first application is the foreground application, the program comprises further instructions that cause the processor to:

determine an application priority level M of the first application in a preset period in response to determining that the first application is not the foreground application; and in response to determining that the application priority level M is higher than or equal to a preset level H, allocating, according to channel quality of the available network channel in the corresponding preset period, a network channel with highest channel quality from the available network channel, as the target network channel of the first application.

17. The terminal according to claim 16, wherein after allocating the target network channel to the first application, the program comprises further instructions that cause the processor to:

determine whether the target network channel is the restricted network channel of the first application; and in response to determining that the target network channel is the restricted network channel of the first application, and the first application is the foreground application or the application priority level M of the first application is higher than or equal to the preset level H, allocating, from the available network channel, a network channel with channel quality only second to the highest channel quality as a new target network channel of the first application.

18. The terminal according to claim 16, wherein after allocating the target network channel to the first application, the program comprises further instructions that cause the processor to:

determining whether the target network channel is the restricted network channel of the first application; and in response to determining that the target network channel is the restricted network channel of the first application, and the application priority level M of the first application is lower than the preset level H, allocating, from the available network channel, a network channel with channel quality only higher than the lowest channel quality as a new target network channel of the first application.

* * * * *